United States Patent
Chiou et al.

(10) Patent No.: US 8,733,929 B2
(45) Date of Patent: May 27, 2014

(54) COLOR CONTRAST ENHANCING SUNGLASS LENS

(75) Inventors: Michael Chiou, Yunlin County (TW); Shih-Lung Huang, Tainan (TW)

(73) Assignee: Cornerstone Optical Co., Ltd., Chia Yi County (TW)

(*) Notice: Subject to any disclaimer, the term of this patent is extended or adjusted under 35 U.S.C. 154(b) by 97 days.

(21) Appl. No.: 13/618,307

(22) Filed: Sep. 14, 2012

(65) Prior Publication Data

US 2013/0271725 A1 Oct. 17, 2013

(30) Foreign Application Priority Data

Apr. 13, 2012 (TW) .................................. 101113233

(51) Int. Cl.
*G02C 7/10* (2006.01)

(52) U.S. Cl.
CPC ........................................ *G02C 7/10* (2013.01)
USPC .................... 351/159.65; 351/159.62; 351/44; 359/722

(58) Field of Classification Search
CPC ............................... G02C 7/10; G02C 2202/16
USPC ......... 351/44, 159.6, 159.62, 159.63, 159.64, 351/159.65; 359/722

See application file for complete search history.

(56) References Cited

U.S. PATENT DOCUMENTS

| | | | |
|---|---|---|---|
| 5,157,426 A * | 10/1992 | Kronberg | 351/159.6 |
| 5,646,781 A | 7/1997 | Johnson, Jr. | |
| 6,145,984 A | 11/2000 | Farwig | |
| 6,604,824 B2 | 8/2003 | Larson | |
| 6,612,697 B1 * | 9/2003 | Aurelius et al. | 351/159.62 |
| 7,959,295 B2 * | 6/2011 | Richards et al. | 353/7 |
| 2002/0140901 A1 * | 10/2002 | Reichow et al. | 351/163 |

* cited by examiner

Primary Examiner — Darryl J Collins

(74) Attorney, Agent, or Firm — Ladas & Parry, LLP

(57) ABSTRACT

A color contrast enhancing sunglass lens includes a lens body and a multi-layer coating disposed on the lens body. The multi-layer coating includes a set of alternating layers formed of materials having different refractive indices and confines the transmission of visible light to a predetermined spectral profile having at least three high transmission bands that include blue, green and red bands and that have a maximum of spectral transmittance no less than 60%, three low transmission bands that include purple, cyan and yellow bands and that have a minimum of spectral transmittance no greater than 40%, and no spectral transmittance being less than 15% between 475 and 650 nm. The color contrast enhancing sunglass lens as disclosed meets the ANSI specification Z80.3-2009 section 4.6.3.3.

16 Claims, 6 Drawing Sheets

COLOR CONTRAST ENHANCING SUNGLASS LENS

CROSS-REFERENCE TO RELATED APPLICATION

This application claims priority to Taiwanese application no. 101113233, filed on Apr. 13, 2012, the disclosure of which is hereby incorporated by reference in its entirety.

BACKGROUND OF THE INVENTION

1. Field of the Invention

This invention relates to a sunglass lens, more particularly to a color contrast enhancing sunglass lens comprising a lens body and a multi-layer coating.

2. Description of the Related Art

Besides conventional functions for attenuation of light and UV protection, along with the increasing demand for color contrast enhancement, the use of color contrast enhancing lenses has become increasingly popular in sunglasses. As used herein, the phrase "color contrast" refers to the difference in color that makes an object distinguishable. The image of an object can be enhanced by increasing the difference in light transmission between primary color bands (i.e., the blue band having a wavelength ranging from 430 nm~470 nm, the green band having a wavelength ranging from 520 nm~570 nm, and the red band having a wavelength ranging from 620 nm~680 nm) and inter-primary color bands (i.e., the cyan band having a wavelength ranging from 470 nm~520 nm, the yellow band having a wavelength ranging from 570 nm~590 nm, and the orange band having a wavelength ranging from 590 nm~620 nm). Therefore, a sunglass lens capable of enhancing the contrast of primary color will have a spectral profile with at least one high transmission band in the wavelength range of primary color bands, and at least one low transmission band in the wavelength range of inter-primary color bands.

To maximize the color contrast effect of a sunglass lens, some techniques for creating relatively steep sloped spectral profile have been exploited. These techniques include applications of a rare-earth doped glass material and a multi-layer coating to the sunglass lens.

U.S. Pat. No. 6,604,824 issued to Larson discloses a rare-earth doped polarized lens system. The spectral transmittance profile of a neodymium added lens wafer (1.0 mm thick) used in Larson's lens system is shown in FIG. 1. During preparation of the lens wafer, after neodymium oxide ($Nd_2O_3$) is melted in a glass matrix, the $Nd^{3+}$ ions have strong absorption in the yellow band at about 584 nm. Thus, the Larson lens system enhances the contrast of red and green to yellow. However, the Larson lens system shows no low transmission band in the cyan band centered at about 500 nm for enhancing the contrast of blue and green to cyan. Therefore, the rare-earth doped lenses can enhance the contrast of only part of but not all of the three primary colors.

In contrast to the application of a rare-earth doped glass material, use of a multi-layer coating provides a more flexible method in spectral profile design. U.S. Pat. No. 5,646,781 issued to Johnson Jr. discloses an optical filter for forming an enhanced image made by stacking a multi-layer coating on a substantially transparent substrate. The spectral profile of the filter of Johnson Jr. is designed to block passbands substantially centered at 490 nm and 590 nm. The spectral transmittance profile of a filter of Johnson Jr. that is used for the human eye is shown in FIG. 2. The filter shows strong primary color contrast. However, some serious problems prohibit the filter of Johnson Jr. from being a useful sunglass lens. First, the filter blocks the transmittance of light at 490 nm and 590 nm, and thus, it fails to meet the ANSI specification Z80.3-2009 section 4.6.3.3 for traffic signal recognition, which requires the spectral transmittance of a tinted lens to be not less than 20% of the lens luminous transmittance between 475 nm and 650 nm. Moreover, when used under bright sunlight condition, the filter made from the transparent substrate and the multi-layer coating produces unpleasant reflection to incident light from behind the wearer or the wearer's face. The wearer will see the reflected image from the rear surface of the filter. Furthermore, the filter allows relatively high transmission of orange light at 610 nm and 620 nm, and thus is not good for enhancing the contrast of red from orange. Meanwhile, the filter suppresses the transmission of yellow green light at 560 nm, and thus, the color of green plants looks more bluish, a sense of reduced saturation of green.

Therefore, there is an unfulfilled need for a color contrast enhancing sunglass lens that simultaneously provides color contrast enhancement to all three primary colors without undesired reflection, complete UV protection, image sharpness improvement by blocking short-wavelength visible light between 380 nm and 410 nm, and meets the requirements of traffic signal recognition as defined by ANSI Z80.3-2009 section 4.6.3.

SUMMARY OF THE INVENTION

Therefore, the object of the present invention is to provide a color contrast enhancing sunglass lens that can alleviate at least one of the aforesaid drawbacks of the prior art.

According to this invention, a color contrast enhancing sunglass lens includes:

a lens body made from an optical material and having a luminous transmittance between 8% and 40%; and a multi-layer coating disposed on the lens body and including a set of alternating layers formed of materials having different refractive indices, the multi-layer coating confining transmission of visible light to a predetermined spectral profile having at least three high transmission bands, three low transmission bands, and spectral transmittance being not less than 15% between 475 nm and 650 nm, wherein the three high transmission bands include a blue band centered at about 450 nm, a green band centered at about 545 nm, and a red band centered at about 650 nm, each of the high transmission bands having a maximum of spectral transmittance not less than 60%; and wherein the three low transmission bands include a purple band centered at about 405 nm, a cyan band centered at about 490 nm, and a yellow band centered at about 590 nm, each of the low transmission bands having a minimum of spectral transmittance not greater than 40%.

BRIEF DESCRIPTION OF THE DRAWINGS

Other features and advantages of the present invention will become apparent in the following detailed description of the preferred embodiment of this invention, with reference to the accompanying drawings, in which.

DETAILED DESCRIPTION OF THE PREFERRED EMBODIMENT

Figure 1:
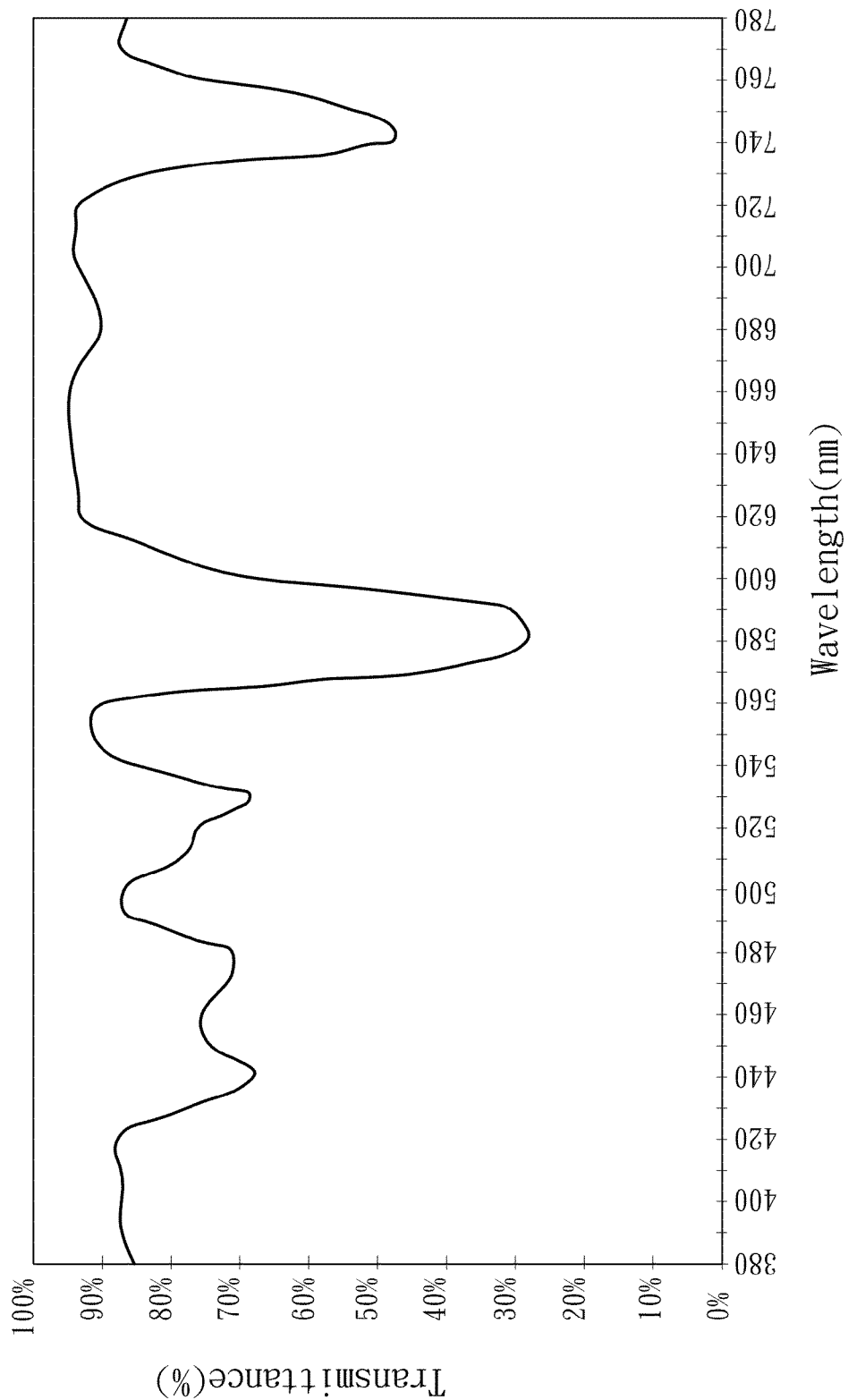
FIG. 1 is a transmission spectrum diagram to illustrate spectral characteristics of a conventional glass lens wafer containing neodymium oxide as disclosed in U.S. Pat. No. 6,604,824.
Figure 2:
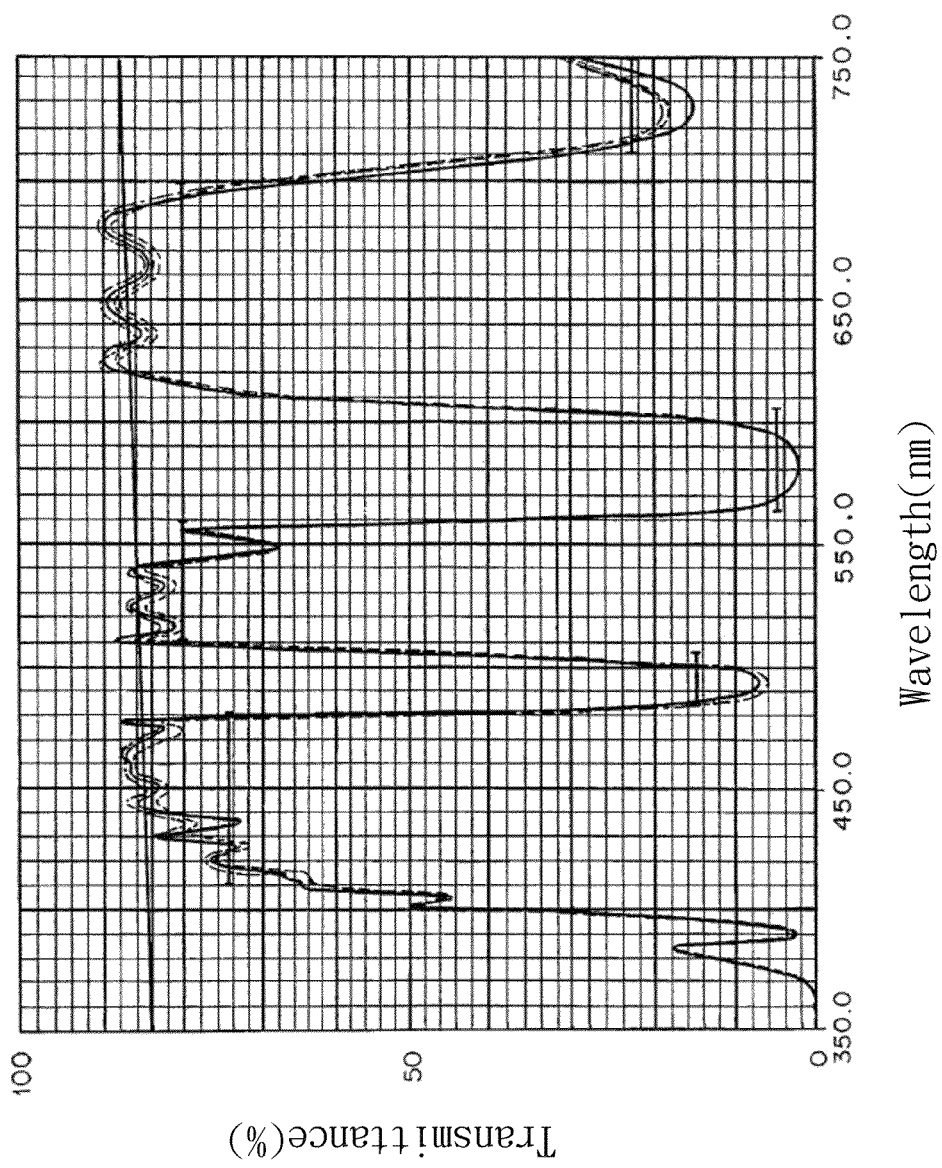
FIG. 2 is a transmission spectrum diagram to illustrate spectral characteristics of a conventional optical filter as disclosed in U.S. Pat. No. 5,646,781.
Figure 3:
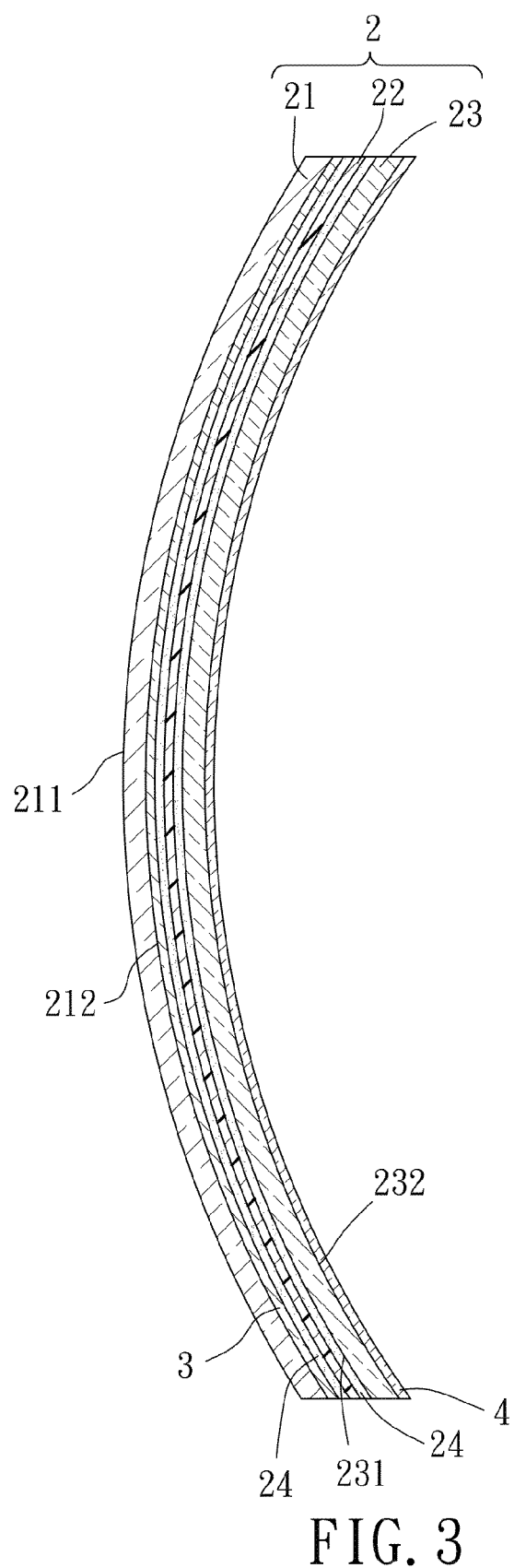
FIG. 3 is a schematic view to illustrate the preferred embodiment of a sunglass lens according to the invention.

Referring to FIG. 3, the preferred embodiment of a color contrast enhancing sunglass lens according to this invention includes a lens body 2 and a multi-layer coating 3 disposed on the lens body 2.

The lens body 2 includes a first lens layer 21, a second lens layer 23, and a polarizing layer 22 laminated between the first lens layer 21 and the second lens layer 23.

The first and second lens layer 21, 23 are made from a transparent optical material such as glass or plastic. An UV absorber may be added to the transparent optical material for blocking UV rays so as to improve UV protection effect of the preferred embodiment of this invention. The first lens layer 21 is formed with a predetermined curvature and has a first convex surface 211 and a first concave surface 212 opposite to the first convex surface 211. The second lens layer 23 is also formed with a predetermined curvature and has a second convex surface 231 and a second concave surface 232 opposite to the second convex surface 231. The second convex surface 232 defines a rear surface to be disposed close to a wearer's eyes when the sunglass lens is assembled on a sunglass frame.

Preferably, the polarizing layer 22 is made from a polyvinyl alcohol (PVA) based film. Preparation of the polarizing layer 22 is not an essential feature of this invention and can be carried out by processes well known in the art, and thus, details thereof are omitted herein. The polarizing layer 22 is bonded to the multi-layer coating 3 and the second convex surface 231 of the second lens layer 23 respectively using two optical adhesive layers 24. The polarizing layer 22 is used in the sunglass lens of the invention at least for achieving the following purposes: (1) blocking plane polarized glare that is produced when bright light is reflected from smooth surfaces like water, snow, and roadways, (2) attenuating light entering the lens body 2 from the first convex surface 211, and (3) attenuating annoying rear surface reflection produced by the multi-layer coating 3.

Preferably, the luminous transmittance of the lens body ranges between 8% and 40%. More preferably, the luminous transmittance of the lens body ranges between 12% and 20%. The color contrast enhancing effect produced by the multi-layer coating 3 will be seriously suppressed if the luminous transmittance of the lens body 2 ranges lower than 8%. On the other hand, the rear surface reflection produced by the multi-layer coating 3 will be too strong to be effectively reduced by the lens body 2 if the luminous transmittance of the lens body is higher than 40%. In the preferred embodiment of this invention, the luminous transmittance of the lens body 2 is adjusted through the luminous transmittance of the polarizing layer 22.

The multi-layer coating 3 may be disposed on either the first convex surface 211 or the first concave surface 212 of the first lens layer 21. Preferably, the multi-layer coating 3 is disposed on the first concave surface 212 for protecting the multi-layer coating 3 from abrasion and moisture attack.

Preferably, the multi-layer coating 3 includes a set of alternating layers formed of materials having different refractive indices. The multi-layer coating 3 confines transmission of visible light to a predetermined spectral profile having at least three high transmission bands, three low transmission bands, and spectral transmittance being not less than 15% between 475 nm and 650 nm. Specifically, the three high transmission bands includes a blue band centered at about 450 nm, a green band centered at about 545 nm, and a red band centered at about 650 nm, each of the high transmission bands having a maximum of spectral transmittance not less than 60%, and the three low transmission bands include a purple band centered at about 405 nm, a cyan band centered at about 490 nm, and a yellow band centered at about 590 nm, each of the low transmission bands having a minimum of spectral transmittance not greater than 40%.

Preferably, the width of each of the three high transmission bands is between 30~80 nm, as measured at one-half the maximum transmission thereof. More preferably, the width of the blue band is from 30 nm to 50 nm, the width of the green band is from 40 nm to 60 nm, and the width of the red band is from 60 nm to 80 nm.

More preferably, the refractive indices of the materials for making the set of alternating layers of the multi-layer coating 3 include a high refractive index ranging from 1.8~2.72 and a low refractive index ranging from 1.2~1.8. The spectral profile of the multi-layer coating 3 is predetermined through the selection of coating materials, the number of layers, and the thickness of each layer. Most preferably, the materials having the high refractive index may be selected from the group consisting of $Ta_2O_5$, $TiO_2$, $Ti_3O_5$, $HfO_2$, $ZrO_2$, CdS, ZnSe, and combinations thereof, and the materials having the low refractive index may be selected from the group consisting of $SiO_2$, $MgF_2$, CaF, $NdF_3$, $ThF_4$, $HfF_2$, and combinations thereof.

Preferably, the sunglass lens enhances color contrast by providing a transmission property that the average transmission of red light at 630 nm and 640 nm is at least 5% greater than the average transmission of yellow light at 580 nm, 590 nm, and 600 nm.

More preferably, the sunglass lens provides a transmission property that the average transmission of green light at 540 nm and 550 nm is at least 5% greater than the average transmission of yellow light at 580 nm, 590 nm, and 600 nm.

More preferably, the sunglass lens provides a transmission property that the average transmission of green light at 540 nm and 550 nm is at least 5% greater than the average transmission of cyan light at 490 nm, 500 nm, and 510 nm.

More preferably, the sunglass lens provides a transmission property that the average transmission of blue light at 450 nm and 460 nm is at least 5% greater than the average transmission of cyan light at 490 nm, 500 nm, and 510 nm.

More preferably, the sunglass lens has a spectral transmittance not greater than 2% between 380 nm and 410 nm so as to improve the image sharpness that maybe reduced by the scattering of short-wavelength visible light.

Preferably, the color contrast enhancing sunglass lens further includes an anti-reflection coating 4 applied on the second concave surface 232 of the second lens layer 23 for reducing the rear surface reflection produced by the multi-layer coating 3. Preparation of the anti-reflection coating 4 is not an essential feature of this invention and can be carried out by processes well known in the art, and thus, details thereof are omitted herein.

Preferably, the sunglass lens of this invention may further include a hydrophobic layer formed on either the first convex surface 211 of the first lens layer 21, or the anti-reflection coating 4, or both, for easier cleaning of the sunglass lens.

As further explained herein, alternatively, the lens body 2 may be a tinted lens with a single layer structure. The luminous transmittance of the single layer lens body 2 may be carefully adjusted through selecting appropriate colorants and tinting processes so as to comply with the luminous transmittance requirements of this invention. Preferably, when the lens body 2 has a single layer structure with a convex surface and a concave surface, the multi-layer coating 3 may be formed on the convex surface of the lens body 2 and the anti-reflection coating 4 may be formed on the concave surface of the lens body 2. More preferably, the hydrophobic layer may be further respectively formed on the multi-layer coating 3 and the anti-reflection coating 4.

The merits of the color contrast enhancing sunglass lens of this invention will become more apparent with reference to the following two Examples and four Comparative Examples. These examples are only illustrative and are not intended to limit the scope of the invention.

EXAMPLE 1

Grey Polarized Sunglass Lens

An UV absorbing optical grade glass blank (CORNING® "UV CLEAR", code number 8010) was ground and polished into a 1.0 mm thick clear wafer having a predetermined curvature that is well known to the sunglass industry; for example, 6 or 8 or 9 base. The clear wafer was then chemically tempered in a potassium nitrate bath containing 99.5% potassium nitrate and 0.5% Silicic acid at 450 degree Celsius for 16 hours so as to obtain a substantially transparent first lens layer 21 which blocks the transmission of light in the wavelength range between 290 nm~400 nm. The first lens layer 21 was thoroughly cleaned and a multi-layer coating 3 having a layered arrangement as shown in Table 1 was disposed in vacuum on the first concave surface 212 of the first lens layer 21.

TABLE 1

| Layer No. | Material | Refractive Index | Thickness (nm) |
|---|---|---|---|
| 1 | $Ti_3O_5$ | 2.40 | 159.32 |
| 2 | $SiO_2$ | 1.45 | 142.51 |
| 3 | $Ti_3O_5$ | 2.40 | 100.37 |
| 4 | $SiO_2$ | 1.45 | 149.59 |
| 5 | $Ti_3O_5$ | 2.40 | 4.88 |
| 6 | $SiO_2$ | 1.45 | 260.94 |
| 7 | $Ti_3O_5$ | 2.40 | 36.71 |
| 8 | $SiO_2$ | 1.45 | 144.74 |
| 9 | $Ti_3O_5$ | 2.40 | 70.91 |
| 10 | $SiO_2$ | 1.45 | 196.44 |
| 11 | $Ti_3O_5$ | 2.40 | 28.02 |
| 12 | $SiO_2$ | 1.45 | 226.93 |
| 13 | $Ti_3O_5$ | 2.40 | 193.29 |
| 14 | $SiO_2$ | 1.45 | 37.74 |
| 15 | $Ti_3O_5$ | 2.40 | 102.63 |

An optical grade glass blank (CORNING® "UV 330", code number 8048) was ground and polished into a 0.8 mm thick clear wafer having a predetermined curvature substantially the same as the first lens layer 21. The clear wafer was then chemically tempered in a potassium nitrate bath at 450 degree Celsius for 16 hours so as to obtain a substantially transparent second lens layer 23. The second lens layer 23 was thoroughly cleaned and an anti-reflection coating 4 was disposed in vacuum on the second concave surface 232 of the second lens layer 23.

A 0.03 mm thick flat grey polarized film having a luminous transmittance of 18% was first thermally bent to have a substantially identical curvature as that of the first and second lens layers 21, 23. Then, an optical grade epoxy adhesive was applied to laminate the grey polarized film with the multi-layer coating 3 and the second convex surface 231 of the second lens layer 23. The above laminate was then cured at 60 degree Celsius for 3 hours to obtain the grey polarizing sunglass lens.

EXAMPLE 2

Brown Polarized Sunglass Lens

The sunglass lens of Example 2 was made in a manner similar to that of Example 1 except that the grey polarized film was replaced with a brown polarized film having a luminous transmittance of 18%.

COMPARATIVE EXAMPLE 1

A grey polarized sunglass lens was made according to U.S. Pat. No. 6,604,824 issued to Larson, and marketed by COSTA DEL MAR SUNGLASSES, INC. under the name "Gray 580G™" (hereinafter referred to as "Larson grey").

COMPARATIVE EXAMPLE 2

A grey polarized sunglass lens was made according to U.S. Pat. No. 6,145,984 issued to Farwig, and marketed by MAUI JIM, INC. under the name "Neutral Grey" (hereinafter referred to as "Farwig grey").

COMPARATIVE EXAMPLE 3

A brown polarized sunglass lens was made according to U.S. Pat. No. 6,604,824 issued to Larson, and marketed by COSTA DEL MAR SUNGLASSES, INC. under the name "Copper 580G™" (hereinafter "Larson brown").

COMPARATIVE EXAMPLE 4

A brown polarized sunglass lens was made according to U.S. Pat. No. 6,145,984 issued to Farwig, and marketed by MAUI JIM, INC. under the name "HCL® Bronze" (hereinafter "Farwig brown").

For explaining the unique features of the multi-layer coating 3 of the sunglass lens of this invention, the multi-layer coating 3 was prepared and scanned for obtaining the spectral transmittance profile thereof. In the same manner, for explaining the unique features of the polarized sunglass lenses according to this invention, the polarized sunglass lenses made according to Examples 1 and 2 and Comparative examples 1 to 4 were scanned for obtaining their spectral transmittance profiles and making a comparison of these sunglass lenses in terms of their color contrast enhancing effect.

Spectral Transmittance Measurement for Multi-Layer Coating

The method for measuring the spectral transmittance profile of the multi-layer coating includes the steps of preparing the multi-layer coating on a transparent substrate, and using a Hitachi U-3000 spectrophotometer to scan the multi-layer coated substrate for obtaining the spectral transmittance profile.

Figure 4:
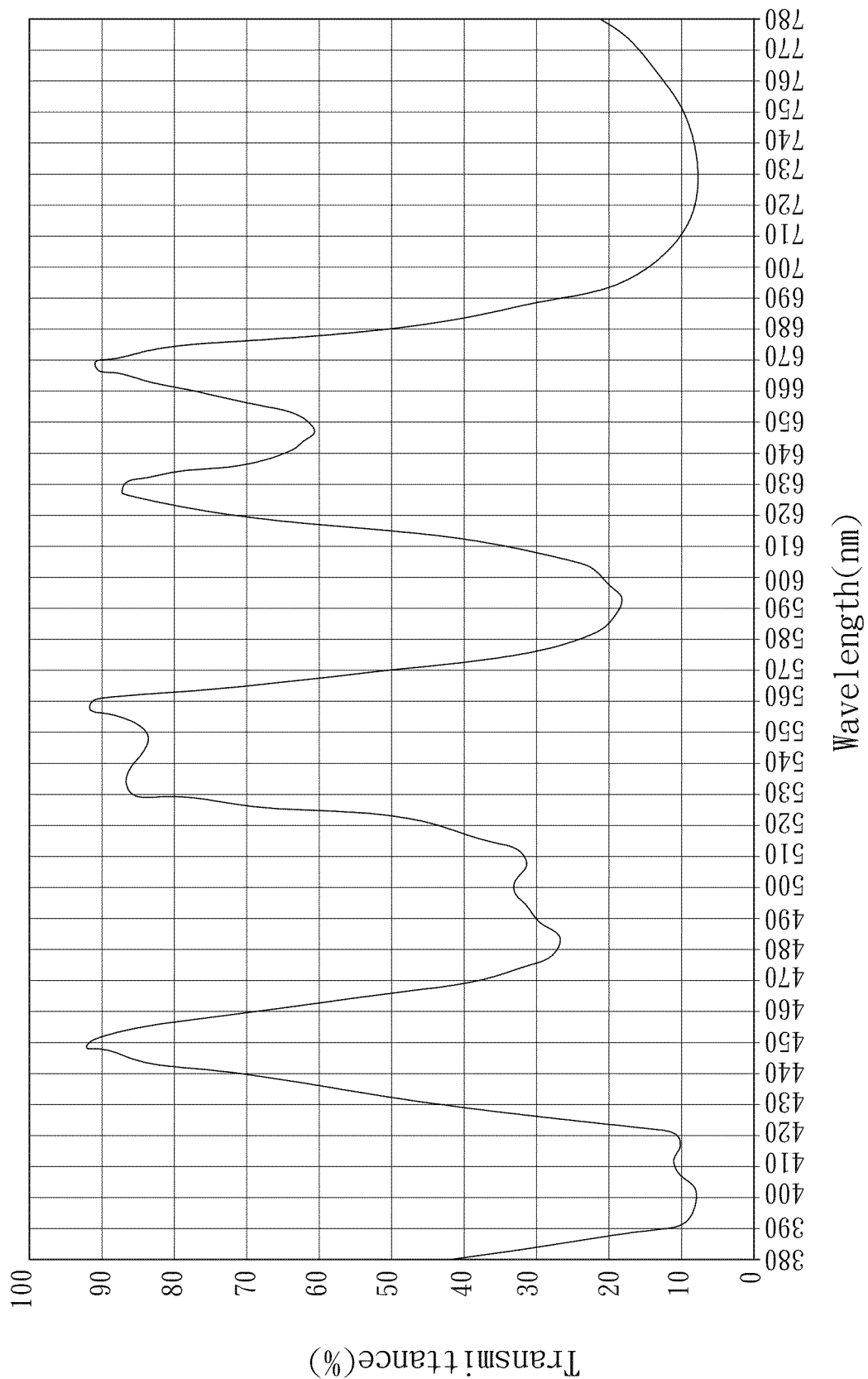
FIG. 4 is a transmission spectrum diagram to illustrate spectral characteristics of a multi-layer coating included in the preferred embodiment of the sunglass lens according to the invention.

For a faithful presentation of the spectral transmittance profile of the multi-layer coating 3, the transparent substrate used here was selected from CORNING® UV330 which has no special absorption throughout the whole visible light wavelength range 380~780 nm. More specifically, a CORNING® UV330 glass blank was ground and polished into a 1.0 mm thick clear wafer having a predetermined curvature such as 8 base. The clear wafer was then chemically tempered in a potassium nitrate bath containing 99.5% potassium nitrate and 0.5% silicic acid at 450 degree Celsius for 16 hours. The tempered clear wafer was thoroughly cleaned and deposited with a multi-layer coating 3 in vacuum by the sequence and thicknesses given in Table 1. FIG. 4 illustrates the resulting spectral transmittance profile of the multi-layer coating 3.

Referring to FIG. 4, the spectral transmittance profile of the multi-layer coating 3 includes three high transmission bands comprising the blue, green and red bands, and respectively centered at about 450 nm, 545 nm, and 650 nm. Each of the transmission bands has a maximum transmission not less than 60%. The spectral transmittance profile of the multi-layer coating 3 also includes three low transmission bands comprising the purple, cyan and yellow bands and respectively centered at about 405 nm, 490 nm, and 590 nm. Each of the low transmission bands has a minimum transmission not greater than 40%. Besides, in the spectral transmittance profile of the multi-layer coating 3, spectral point has a transmission not less than 15% between 475 nm and 650 nm.

The width of the blue band is from about 30 nm to about 50 nm as measured at one-half the maximum transmission of the blue band. The width of the green band is from about 40 nm to about 60 nm as measured at one-half the maximum transmission of the green band. The width of the red band is from about 60 nm to about 80 nm as measured at one-half the maximum transmission of the red band. It is apparent that the multi-layer coating 3 provides high transmission in all three primary bands and low transmission in inter-primary bands, and thus, effectively enhances the color contrast of all three primary color bands. Moreover, since no spectral point of the multi-layer coating 3 has a transmission less than 15% between 475 nm and 650 nm, after laminating with an 18% luminous transmittance polarized film, the resulting sunglass lens meets the ANSI specification Z80.3-2009 section 4.6.3.3 for traffic signal recognition, and section 4.6.1 for general purpose sunglasses. Hence, this invention can provide a very useful sunglass lens by means of inclusion of the multi-layer coating 3.

Spectral Transmittance Profile of Grey Polarized Lens

Figure 5:
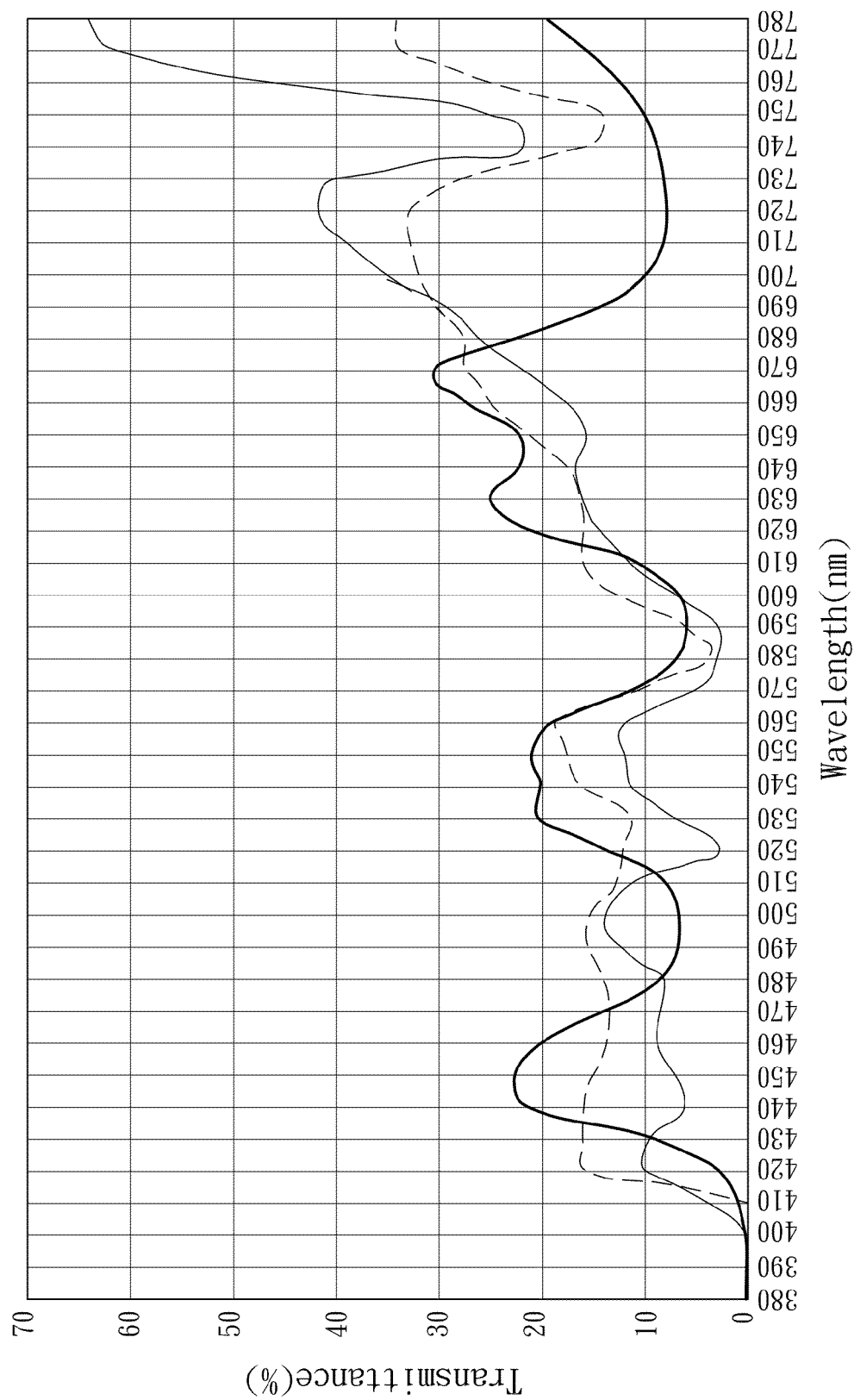
FIG. 5 is a transmission spectrum diagram to illustrate spectral characteristics of the sunglass lens of Example 1 of this invention and of the sunglass lenses of Comparative Examples 1 and 2.

FIG. 5 is a comparison of the spectral transmittance profile of the grey polarized sunglass lenses of Example 1 and Comparative Examples 1 and 2. The bold solid line (———) represents the grey polarized sunglass lens of Example 1 according to the invention. The dotted line (- - -) represents the grey polarized sunglass lens of Comparative Example 1 according to Larson's patent. The fine solid line (-) represents the grey polarized sunglass lens of Comparative Example 2 according to Farwig's patent.

It is noted from the transmittance of cyan band near 500 nm, the grey polarized sunglass lens of Example 1 shows a low transmission band having a transmittance lower than 8% near 500 nm while no significantly low transmission band was found with the Larson grey and the Farwig grey at around 500 nm. Meanwhile, the grey polarized sunglass lens of Example 1 blocks light transmission within the wavelength range of 380 nm~410 nm, and thus, is able to provide additional UV protection and enhanced image sharpness.

Spectral Transmittance Profile of Brown Polarized Lens

Figure 6:
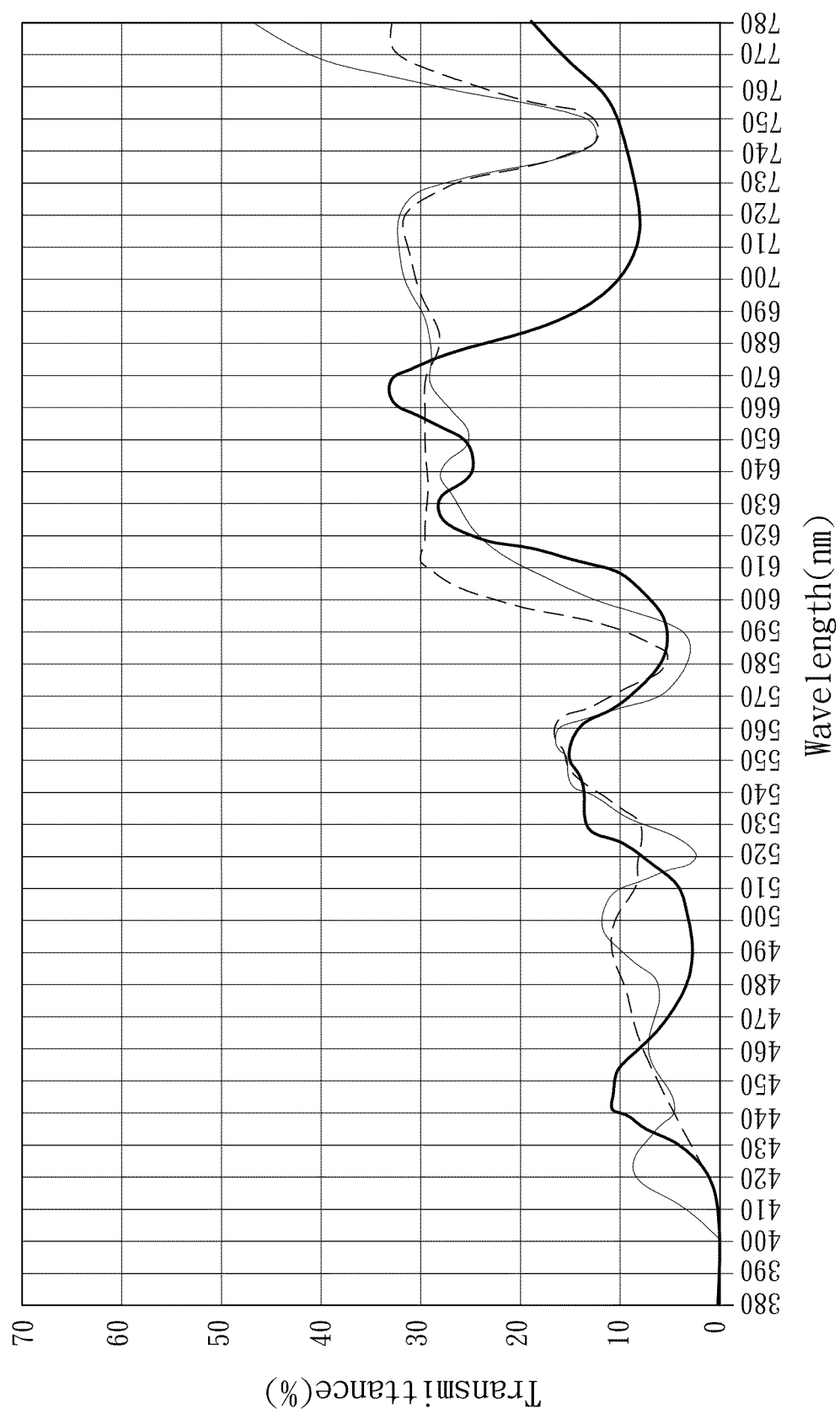
FIG. 6 is a transmission spectrum diagram to illustrate spectral characteristics of the sunglass lens of Example 2 of this invention and of the sunglass lenses of Comparative Examples 3 and 4.

FIG. 6 is a comparison of the spectral transmittance profile of brown polarized sunglass lenses of Example 2 and Comparative Examples 3 and 4. The bold solid line (———) represents the brown polarized sunglass lens of Example 2 according to the invention. The dash line (- - -) represents the brown polarized sunglass lens of Comparative Example 3 according to Larson's patent. The fine solid line (-) represents the brown polarized sunglass lens of Comparative Example 4 according to Farwig's patent.

It is noted from the transmittance of cyan band near 500 nm, the brown polarized sunglass lens of this invention shows a low transmission band having a transmittance lower than 8% near 500 nm while no significantly low transmission band was found with the Larson brown and the Farwig brown at around 500 nm. Meanwhile, the brown polarized sunglass lens of Example 2 blocks light transmission within the wavelength range of 380 nm~410 nm, and thus, is able to provide additional UV protection and enhanced image sharpness.

Comparison of Color Contrast Effect

The applicant of this invention conceived a rating method for evaluating the color contrast effect of sunglass lenses. More specifically, the rating method includes the steps of (1) using the Hitachi U-3000 spectrophotometer to scan sunglass lens samples for obtaining their spectral transmittance data. The scan range was set from 380 nm to 780 nm and the wavelength interval among spectral data was 10 nm, (2) recording the transmittance at key wavelengths for red, yellow, green, cyan, and blue bands, respectively, (3) averaging the key transmittance of each color band to get the mean transmittance of each color band, and (4) subtracting the mean transmittance of the inter-primary band from the mean transmittance of the adjacent primary color band so as to obtain an indicator value of color contrast effect for each primary color band. The higher the indicator value, the stronger the color contrast effect the sunglass lens will have.

Table 3 illustrates a comparison of the color contrast effect of grey polarized sunglass lenses of Example 1, and Comparative Examples 1 and 2. Table 4 illustrates a comparison of color contrast effect of brown polarized sunglass lenses of Example 2 and Comparative Examples 3 and 4.

TABLE 3

Color contrast comparison of grey lenses

| Color bands | Key wavelength (nm) | Key spectral transmittance (%) | | |
|---|---|---|---|---|
| | | Example 1 | Comparative Example 1 | Comparative Example 2 |
| Red (R) | 630 | 21.91 | 18.04 | 16.80 |
| | 640 | 25.00 | 15.89 | 15.82 |
| Yellow (Y) | 600 | 6.64 | 13.11 | 7.17 |
| | 590 | 5.60 | 5.80 | 2.50 |
| | 580 | 6.82 | 3.77 | 2.45 |
| Green (G) | 550 | 20.63 | 17.55 | 11.8 |
| | 540 | 19.86 | 15.8 | 11.16 |
| Cyan (C) | 510 | 7.94 | 12.57 | 10.34 |
| | 500 | 6.47 | 14.95 | 13.78 |
| | 490 | 6.75 | 15.44 | 12.42 |
| Blue (B) | 460 | 19.57 | 13.91 | 8.53 |
| | 450 | 22.39 | 15.00 | 7.02 |
| Mean transmittance* (%) | TR | 23.46 | 16.97 | 16.31 |
| | TY | 6.35 | 7.56 | 4.04 |
| | TG | 20.25 | 16.68 | 11.48 |
| | TC | 7.05 | 14.32 | 12.18 |
| | TB | 20.98 | 14.46 | 7.78 |
| Color contrast | C(R, Y) | 17.10 | 9.41 | 12.27 |

TABLE 3-continued

Color contrast comparison of grey lenses

| Color bands | Key wavelength (nm) | Key spectral transmittance (%) | | |
| --- | --- | --- | --- | --- |
| | | Example 1 | Comparative Example 1 | Comparative Example 2 |
| Color contrast indicator** (%) | C(G, Y) | 13.89 | 9.12 | 7.44 |
| | C(G, C) | 13.91 | 2.36 | −0.40 |
| | C(B, C) | 13.93 | 0.14 | −4.41 |

TABLE 4

Color contrast comparison of brown lenses

| Color bands | Key wavelength (nm) | Key spectral transmittance (%) | | |
| --- | --- | --- | --- | --- |
| | | Example 2 | Comparative Example 3 | Comparative Example 4 |
| Red (R) | 630 | 24.84 | 29.50 | 28.06 |
| | 640 | 28.63 | 29.31 | 26.37 |
| Yellow (Y) | 600 | 7.10 | 23.26 | 12.54 |
| | 590 | 5.40 | 9.33 | 3.88 |
| | 580 | 5.89 | 5.10 | 3.45 |
| Green (G) | 550 | 15.25 | 14.90 | 15.65 |
| | 540 | 13.42 | 12.68 | 14.07 |
| Cyan (C) | 510 | 4.13 | 8.50 | 9.76 |
| | 500 | 2.83 | 10.46 | 11.99 |
| | 490 | 2.60 | 10.87 | 10.15 |
| Blue (B) | 460 | 7.95 | 7.75 | 7.21 |
| | 450 | 10.60 | 6.34 | 6.05 |
| Mean transmittance* (%) | TR | 26.74 | 29.41 | 27.22 |
| | TY | 6.13 | 12.56 | 6.62 |
| | TG | 14.34 | 13.79 | 14.86 |
| | TC | 3.19 | 9.94 | 10.63 |
| | TB | 9.28 | 7.05 | 6.63 |
| Color contrast indicator** (%) | C(R, Y) | 20.61 | 16.84 | 20.59 |
| | C(G, Y) | 8.21 | 1.23 | 8.24 |
| | C(G, C) | 11.15 | 3.85 | 4.23 |
| | C(B, C) | 6.09 | −2.90 | −4.00 |

*TR = (T630 + T640)/2, TY = (T600 + T590 + T580)/3, TG = (T540 + T550)/2, TC = (T510 + T500 + T490)/3, TB = (T460 + T450)/2.
**C (R, Y) = TR − TY, C (G, Y) = TG − TY, C (G, C) = TG − TC, C (B, C) = TB − TC

From the data shown in Table 3 and 4, it is evident that the sunglass lenses of this invention have a stronger color contrast enhancing effect than the Larson and Farwig lenses in terms of a mean transmittance difference of at least 5% between red and yellow, at least 5% between green and yellow, at least 5% between green and cyan, and at least 5% between blue and cyan. In general, brown lenses show a weaker effect in enhancing the contrast between blue and cyan than grey lenses due to the higher yellow content of the lens brown tint, and yellow reduces the saturation of blue.

In view of the foregoing, the sunglass lenses of this invention have the following advantages: (1) enhancement of color contrast with all three primary colors through the use of the multi-layer coating 3, (2) improved UV protection and image sharpness by blocking light transmittance within 290 nm~410 nm through the combination of the first lens layer 21 (an UV absorbing lens layer) and the low transmission purple band (380~420 nm) of the multi-layer coating 3, (3) glare protection through the use of the polarizing layer 22, and (4) compliance with the ANSI specification Z80.3-2009 section 4.6 for general purpose sunglasses and traffic signal recognition through the spectral profile obtained from the combination of the multi-layer coating 3 and the polarizing layer 22.

While the present invention has been described in connection with what is considered the most practical and preferred embodiment, it is understood that this invention is not limited to the disclosed embodiment but is intended to cover various arrangements included within the spirit and scope of the broadest interpretation and equivalent arrangements.

What is claimed is:

1. A color contrast enhancing sunglass lens, comprising:
a lens body made from an optical material and having a luminous transmittance ranging between 8% and 40%; and
a multi-layer coating disposed on said lens body and including a set of alternating layers formed of materials having different refractive indices; said multi-layer coating confining transmission of visible light to a predetermined spectral profile having at least three high transmission bands, three low transmission bands, and spectral transmittance being not less than 15% between 475 nm and 650 nm,
wherein said three high transmission bands include a blue band centered at about 450 nm, a green band centered at about 545 nm, and a red band centered at about 650 nm, each of said high transmission bands having a maximum of spectral transmittance not less than 60%; and
wherein said three low transmission bands include a purple band centered at about 405 nm, a cyan band centered at about 490 nm, and a yellow band centered at about 590 nm, each of said low transmission bands having a minimum of spectral transmittance not greater than 40%.

2. The color contrast enhancing sunglass lens of claim 1, wherein the different refractive indices include a high refractive index ranging from 1.8~2.72 and a low refractive index ranging from 1.2~1.8.

3. The color contrast enhancing sunglass lens of claim 1, having a transmission property that the average transmittance of red light at 630 nm and 640 nm is at least 5% greater than the average transmittance of yellow light at 580 nm, 590 nm, and 600 nm.

4. The color contrast enhancing sunglass lens of claim 1, having a transmission property that the average transmittance of green light at 540 nm and 550 nm is at least 5% greater than the average transmittance of yellow light at 580 nm, 590 nm and 600 nm.

5. The color contrast enhancing sunglass lens of claim 1, having a transmission property that the average transmittance of green light at 540 nm and 550 nm is at least 5% greater than the average transmittance of cyan light at 490 nm, 500 nm and 510 nm.

6. The color contrast enhancing sunglass lens of claim 1, having a transmission property that the average transmittance of blue light at 450 nm and 460 nm is at least 5% greater than the average transmittance of cyan light at 490 nm, 500 nm and 510 nm.

7. The color contrast enhancing sunglass lens of claim 1, having a spectral transmittance not greater than 2% between 380 nm and 410 nm.

8. The color contrast enhancing sunglass lens of claim 1, wherein the luminous transmittance of said lens body ranges between 12% and 20%.

9. The color contrast enhancing sunglass lens of claim 1, wherein each of said blue, green and red bands has a width ranging from about 30 nm to about 80 nm as measured at one-half the maximum transmission thereof.

10. The color contrast enhancing sunglass lens of claim 9, wherein said blue band has a width ranging from 30 nm to 50 nm as measured at one-half the maximum transmission of said blue band, said green band having a width ranging from 40 nm to 60 nm as measured at one-half the maximum transmission of said green band, said red band having a width ranging from 60 nm to 80 nm as measured at one-half the maximum transmission of said red band.

11. The color contrast enhancing sunglass lens of claim 1, wherein said lens body includes a convex surface, and a concave surface opposite to said convex surface, said sunglass lens further comprising an anti-reflection coating applied on said concave surface.

12. The color contrast enhancing sunglass lens of claim 11, further comprising a hydrophobic coating applied on said anti-reflection coating.

13. The color contrast enhancing sunglass lens of claim 1, wherein said lens body includes a convex surface, and a concave surface opposite to said convex surface, said sunglass lens further comprising hydrophobic coatings respectively applied on said convex surface and said concave surface.

14. The color contrast enhancing sunglass lens of claim 1, wherein said lens body includes a first lens layer, a second lens layer, and a polarizing layer laminated between said first and second lens layers, and wherein said first lens layer includes a first convex surface and a first concave surface opposite to said first convex surface, said multi-layer coating being applied on one of said first convex surface and said first concave surface, the luminous transmittance of said lens body ranging from 12% to 20%.

15. The color contrast enhancing sunglass lens of claim 14, wherein said multi-layer coating is applied on said first concave surface.

16. The color contrast enhancing sunglass lens of claim 14, wherein said second lens layer includes a second convex surface and a second concave surface opposite to said second convex surface, said sunglass lens further comprising an anti-reflection coating applied on said second concave surface.

* * * * *